United States Patent
Yu et al.

(10) Patent No.: US 12,069,111 B2
(45) Date of Patent: Aug. 20, 2024

(54) VIDEO PROCESSING METHOD AND APPARATUS

(71) Applicant: Beijing Zitiao Network Technology Co., Ltd., Beijing (CN)

(72) Inventors: Zhou Yu, Beijing (CN); Yanxin Kan, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/148,384

(22) Filed: Dec. 29, 2022

(65) Prior Publication Data

US 2023/0216899 A1  Jul. 6, 2023

Related U.S. Application Data

(63) Continuation of application No. PCT/CN2021/120454, filed on Sep. 24, 2021.

(30) Foreign Application Priority Data

Oct. 9, 2020 (CN) .......................... 202011074833.4

(51) Int. Cl.
*H04L 65/403* (2022.01)
*H04L 51/04* (2022.01)
(Continued)

(52) U.S. Cl.
CPC ............ *H04L 65/403* (2013.01); *H04L 51/04* (2013.01); *H04N 5/272* (2013.01); *H04N 7/04* (2013.01)

(58) Field of Classification Search
CPC ..... H04L 51/04; H04L 51/043; H04L 51/046; H04M 3/53–5322; H04M 1/724; H04M 1/72403; H04M 1/7243–72439
(Continued)

(56) References Cited

U.S. PATENT DOCUMENTS 9,876,831 B1 *  1/2018  Leske ................. G06Q 10/107
10,284,812 B1 *  5/2019  Van Os .................. H04N 21/47
(Continued)

FOREIGN PATENT DOCUMENTS

CN       102244695 A      11/2011
CN       104469243 A      3/2015
(Continued)

OTHER PUBLICATIONS

China National Intellectual Property Administration, Office action issued in application No. 202011074833.4, dated Nov. 24, 2021, 18 pages.
(Continued)

*Primary Examiner* — Anthony J Daniels
(74) *Attorney, Agent, or Firm* — Alleman Hall & Tuttle LLP

(57) ABSTRACT

A video processing method and an apparatus are provided in embodiments of the present disclosure. The method includes: detecting an operation instruction of a first user; in response to the operation instruction, displaying an image collected by a camera of the first terminal on a chat page of the first user with a second user in real time, superposing and displaying remaining information except the image within a preset area on the image; and sending the image collected by the camera of the first terminal to a second terminal in real time as a video frame, so that the second terminal displays the image on a chat page of the second user with the first user in real time, and superposes and displays remaining information except the image within a preset area on the image; where the first terminal is a terminal corresponding to the first user.

15 Claims, 11 Drawing Sheets

(51) Int. Cl.
*H04N 5/272* (2006.01)
*H04N 7/04* (2006.01)

(58) Field of Classification Search
USPC .................................................. 348/207.99
See application file for complete search history.

(56) References Cited

U.S. PATENT DOCUMENTS

| | | |
|---|---|---|
| 2013/0227439 A1 | 8/2013 | Shin |
| 2014/0240440 A1* | 8/2014 | Seo .................. H04L 51/04 |
| | | 715/753 |
| 2016/0373388 A1 | 12/2016 | Katis et al. |
| 2017/0244655 A1* | 8/2017 | Moon ................ H04L 12/185 |
| 2018/0145937 A1* | 5/2018 | Choi ................. H04L 51/10 |

FOREIGN PATENT DOCUMENTS

| | | | |
|---|---|---|---|
| CN | 104539871 A | 4/2015 | |
| CN | 104765522 A | 7/2015 | |
| CN | 105120074 A | 12/2015 | |
| CN | 105610788 A | 5/2016 | |
| CN | 105871682 A | 8/2016 | |
| CN | 106341308 A | 1/2017 | |
| CN | 107592492 A | 1/2018 | |
| CN | 108400925 A | 8/2018 | |
| CN | 109889880 A | 6/2019 | |
| CN | 112203151 A | 1/2021 | |
| EP | 2753076 A2 | 7/2014 | |
| JP | 2014170524 A | 9/2014 | |
| JP | 2015531180 A | 10/2015 | |
| JP | 2020509472 A | 3/2020 | |
| JP | 2021517696 A | 7/2021 | |
| KR | 101331444 B1 * | 11/2013 | ............ G06F 3/14 |
| WO | WO-2017087561 A1 * | 5/2017 | ............ G06F 15/16 |
| WO | 2017162010 A1 | 9/2017 | |
| WO | WO-2018069728 A1 * | 4/2018 | ............ G06F 3/048 |
| WO | 2019174477 A1 | 9/2019 | |
| WO | 2020063319 A1 | 4/2020 | |

OTHER PUBLICATIONS

ISA China National Intellectual Property Administration, International Search Report and Written Opinion issued in application No. PCT/CN2021/120454, dated Dec. 23, 2021, WIPO, 12 pages.
China National Intellectual Property Administration, Notification to Grant Patent Right issued in application No. 202011074833.4, dated Apr. 13, 2022, 6 pages.
Miyamori H. et al., "Automatic Indexing of Broadcast Content Using its Live Chat on the Web," IEEE International Conference on Image Processing 2005, Sep. 14, 2005, Genoa, Italy, 4 pages.
Shao Y et al., "An Exploration of The Integration of Live TV And Mobile Phone Broadcasting," Science and Technology Communication, Oct. 25, 2019, 4 pages (Submitted with English Abstract).
European Patent Office, Extended European Search Report Issued in Application No. 21876946.1, Jan. 23, 2024, Germany, 9 pages.
Japan Patent Office, Office Action Issued in Application No. 2023-507881, Feb. 29, 2024, 8 pages.

* cited by examiner

VIDEO PROCESSING METHOD AND APPARATUS

CROSS-REFERENCE TO RELATED APPLICATIONS

This application is a continuation of International Application No. PCT/CN2021/120454, filed on Sep. 24, 2021, which claims priority to Chinese Patent Application No. 202011074833.4, filed on Oct. 9, 2020 and entitled "VIDEO PROCESSING METHOD AND APPARATUS". The disclosures of the aforementioned applications are incorporated by reference in their entireties.

TECHNICAL FIELD

Embodiments of the present disclosure relate to the field of computer and network communication technologies and, in particular, to a video processing method, an apparatus, an electronic device, a computer-readable storage medium, a computer program product and a computer program.

BACKGROUND

With the rapid development of computer and network communication technologies, various social applications arise. In these social applications, users can conduct voice communication, video communication, text communication and other communication with each other. Since the video communication has visibility, the video communication is increasingly used in the social applications.

In the prior art, a video communication method provided by a social application mainly includes the following. First, when a terminal of a user A receives a video request initiated by the user A in a social application, the video request is forwarded to a terminal where a user B is located. Then, after receiving an answering acknowledgement instruction from the user B, the terminal where the user B is located sends an answering acknowledgement message to the terminal used by the user A. Finally, the terminal used by the user A sends a collected video to the terminal where the user B is located, so that only this video is displayed on the terminal where the user B is located; and the terminal used by the user B sends a collected video to the terminal used by the user A, so that only this video is displayed on the terminal where the user A is located.

After carrying out research on the prior art, the applicant found that the existing video display manner is relatively simple, and will affect display of remaining information such as chat content between the user A and the user B, notification information, etc.

SUMMARY

Embodiments of the present disclosure provide a video processing method, an apparatus, an electronic device, a computer-readable storage medium, a computer program product and a computer program, so as to overcome a problem of poor real-time performance of an existing video communication method.

In a first aspect, an embodiment of the present application provides a video processing method, applied to a first terminal, including:

detecting an operation instruction of a first user;

in response to the operation instruction, displaying an image collected by a camera of the first terminal on a chat page of the first user with a second user in real time, superposing and displaying remaining information except the image within a preset area on the image; and sending the image collected by the camera of the first terminal to a second terminal in real time as a video frame, so that the second terminal displays the image on a chat page of the second user with the first user in real time, and superposes and displays remaining information except the image within a preset area on the image; where the first terminal is a terminal corresponding to the first user, and the second terminal is a terminal corresponding to the second user.

In a second aspect, an embodiment of the present application provides a video processing apparatus, applied to a first terminal, including:

an operation instruction detecting module, configured to detect an operation instruction of a first user; and an operation instruction responding module, configured to: in response to the operation instruction, display an image collected by a camera of the first terminal on a chat page of the first user with a second user in real time, superpose and display remaining information except the image within a preset area on the image, and send the image collected by the camera of the first terminal to the second terminal in real time as a video frame, so that the second terminal displays the image on a chat page of the second user with the first user in real time, and superposes and displays remaining information except the image within a preset area on the image; where the first terminal is a terminal corresponding to the first user, and the second terminal is a terminal corresponding to the second user.

In a third aspect, an embodiment of the present application provides an electronic device, including: at least one processor and a memory;

the memory stores computer execution instructions; and
the at least one processor executes the computer execution instructions stored in the memory, so that the at least one processor executes the video processing method in the above first aspect and various possible designs of the first aspect.

In a fourth aspect, an embodiment of the present application provides a computer-readable storage medium, where the computer-readable storage medium stores computer execution instructions, and when the computer execution instructions are executed by a processor, the video processing method in the above first aspect and various possible designs of the first aspect is implemented.

In a fifth aspect, an embodiment of the present application provides a computer program product including computer program instructions, and when the computer execution instructions are executed by a processor, the video processing method in the above first aspect and various possible designs of the first aspect is implemented.

In a sixth aspect, an embodiment of the present application provides a computer program, and when the computer program is executed by a processor, the video processing method in the above first aspect and various possible designs of the first aspect is implemented.

The video processing method and apparatus provided by the embodiments are applied to the first terminal. In the method, the image collected by the camera of the first terminal can be displayed on the chat page, and the remaining information, such as chat content, can be superimposed and displayed on the image. Meanwhile, the image can also be sent to the second terminal, so that the second terminal displays in the same way. In this way, a new video display manner is provided for the first user and the second user in a video communication process, which helps to enrich diversity of video display without affecting display of the remaining information of the first user and the second user.

BRIEF DESCRIPTION OF DRAWINGS

To describe technical solutions in embodiments of the present disclosure or in the prior art more clearly, the following briefly introduces accompanying drawings required for describing the embodiments or the prior art. Apparently, the accompanying drawings in the following description show some embodiments of the present disclosure, and other drawings may also be obtained by a person of ordinary skill in the art according to these drawings without creative efforts.

DESCRIPTION OF EMBODIMENTS

In order to make objects, technical solutions and advantages of embodiments of the present disclosure more apparent, the following will describe the technical solutions in the embodiments of the present disclosure clearly and completely in combination with the accompanying drawings in the embodiments of the present disclosure. Obviously, the described embodiments are only a part but not all of the embodiments of the present disclosure. All other embodiments obtained by a person of ordinary skill in the art based on the embodiments of the present disclosure without creative efforts shall belong to the protection scope of the present disclosure.

Figure 1:
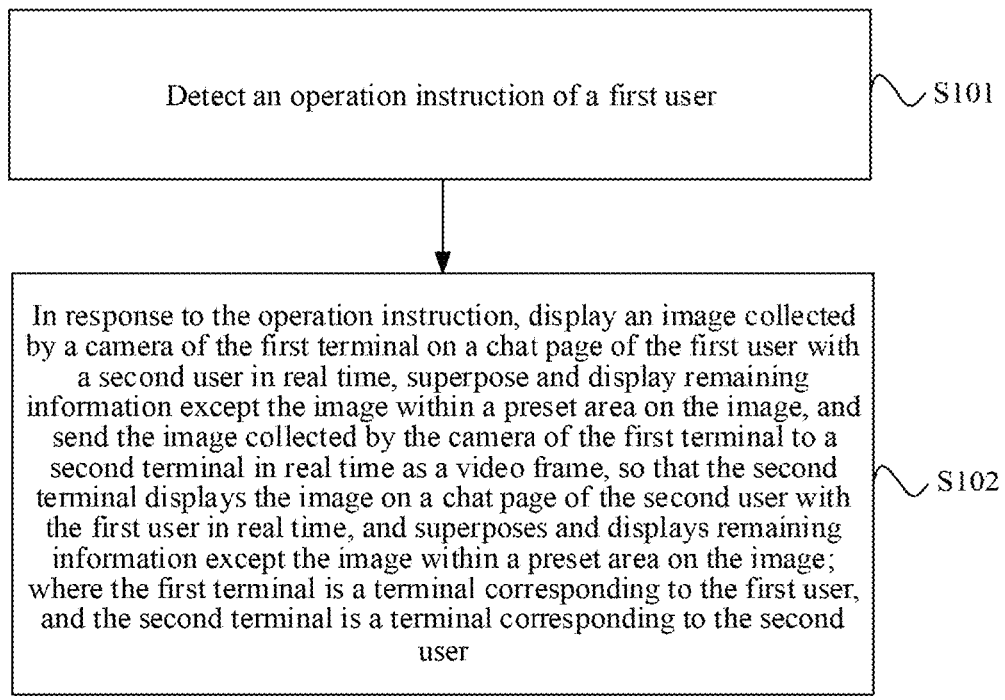
FIG. 1 is a schematic flowchart of a video processing method according to an embodiment of the present disclosure.

Referring to FIG. 1, FIG. 1 is a first schematic flowchart of a video processing method according to an embodiment of the present disclosure. The method in the embodiment may be applied to a first terminal, and the first terminal is a terminal device that sends a video. The video processing method includes the following steps.

S101: detect an operation instruction of a first user.

The operation instruction is an instruction initiated by the first user on the first terminal and used for sending a video, and may be specifically generated when the user operates a video control displayed on the first terminal.

S102: in response to the operation instruction, display an image collected by a camera of the first terminal on a chat page of the first user with a second user in real time, superpose and display remaining information except the image within a preset area on the image, and send the image collected by the camera of the first terminal to a second terminal in real time as a video frame, so that the second terminal displays the image on a chat page of the second user with the first user in real time, and superposes and displays remaining information except the image within a preset area on the image; where the first terminal is a terminal corresponding to the first user, and the second terminal is a terminal corresponding to the second user.

Specifically, the first terminal turns on the camera to collect images, and sends a frame of image to the second terminal every time the frame of image is collected. In this way, the first terminal sends consecutive images to the second terminal, and these consecutive images are displayed on the second terminal to form a video, where each frame of image in the video is referred to as a video frame.

Figure 2:
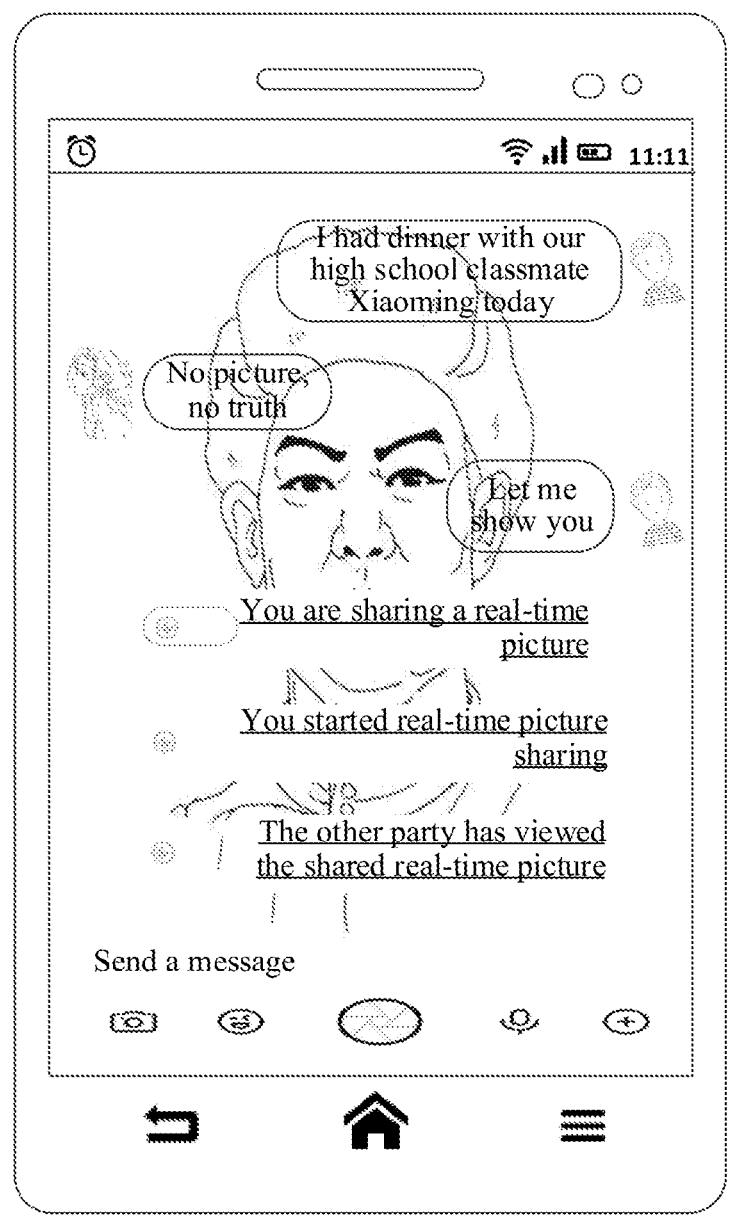
FIG. 2 is a first illustrative diagram of displaying a chat page on a first terminal according to an embodiment of the present disclosure.

The chat page on the first terminal includes remaining information between the first user and the second user, and the remaining information includes, but is not limited to, dialogue information and notification information, where the dialogue information may be in formats such as voices, texts, pictures and video clips. As shown in FIG. 2, the first user sends to the second user a text message "I had dinner with our high school classmate Xiaoming today". Then the second user replies "No picture, no truth" to the first user. Finally, the first user operates a first video control after sending a message "Let me show you" to the second user. After the camera of the first terminal is turned on, a first camera is turned on and collects an image, and the collected image starts to be displayed on the chat page in real time. An image displayed in FIG. 2 may be an image of Xiaoming.

In addition, the first terminal further displays notification information on the chat page. As shown in FIG. 2, after the first user operates the first video control, the first terminal displays notification information "You are sharing a real-time picture"; after the camera is turned on, the first terminal displays notification information "You started real-time picture sharing"; and after the second user receives the real-time picture sharing on the second terminal, notification information "The other party has viewed the shared real-time picture" is displayed.

Figure 3:
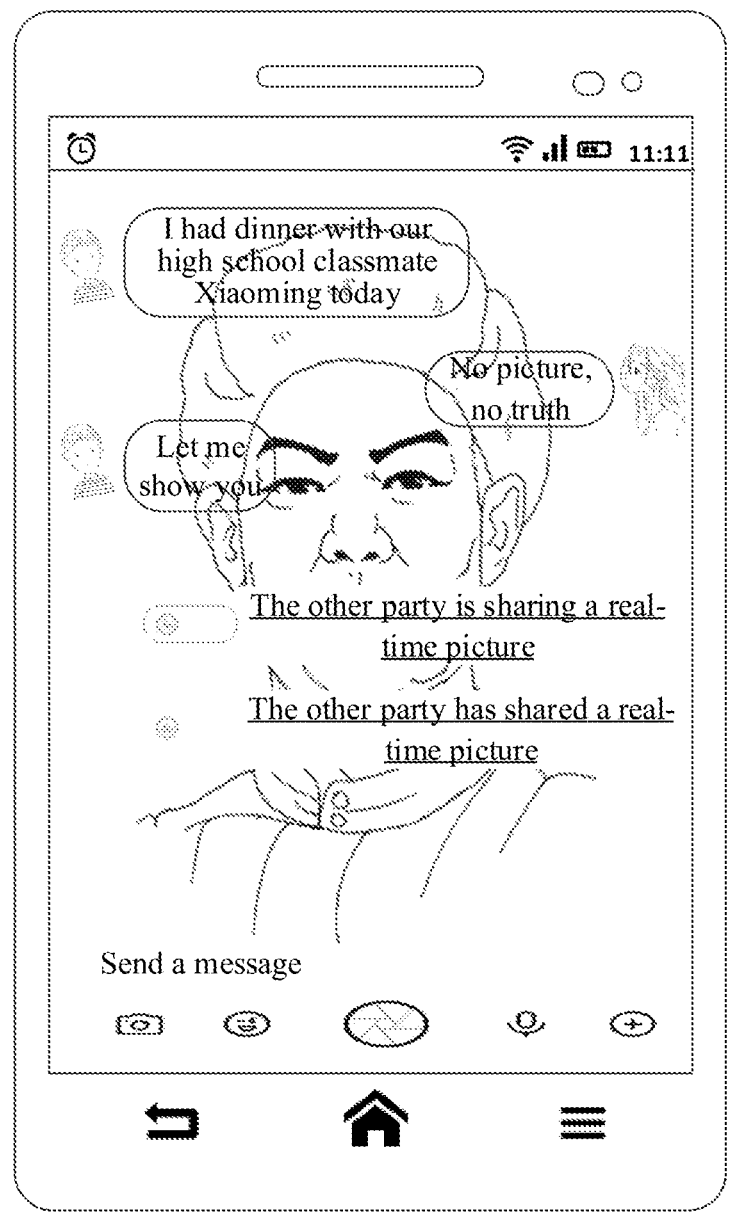
FIG. 3 is a first illustrative diagram of displaying a chat page on a second terminal according to an embodiment of the present disclosure.

Corresponding to the chat page shown in FIG. 2, dialogue information, notification information and the image are also correspondingly displayed on a chat page of the second terminal. As shown in FIG. 3, the dialogue information between the first user and the second user and the image sent by the first terminal are displayed on the chat page. In addition, the second terminal further displays notification information on the chat page. After the first user operates the first video control on the first terminal, notification information "The other party is sharing a real-time picture" is displayed on the chat page of the second terminal. After the first terminal turns on the camera, notification information "The other party has shared a real-time picture" is displayed on the chat page of the second terminal, and at this time, an image sent by the first terminal starts to be displayed in real time on the chat page of the second terminal.

It can be seen that, on the chat page shown in FIG. 2 or FIG. 3, the dialogue information and the notification information are superimposed on the image, that is, the image serves as the background of the chat page, and the dialogue information and the notification information serve as the content of the chat page. In order to avoid the image being blocked by the dialogue information and the notification information, the dialogue information and the notification information superimposed on the upper side need to have a certain transparency, so that the first user views the image superimposed on the lower side through the remaining information superimposed on the upper side.

It can be understood that, displaying images in real time is to display one frame of image every time when the camera collects this image, so that multiple frames of images that are continuously collected form a video on the first terminal. In addition, on the chat page displayed on the first terminal, the first user may also send chat content, which does not affect normal chatting of the first user. For example, the first user may also send chat content "Is it him" on the chat page as shown in FIG. 2 or FIG. 3.

Figure 4:
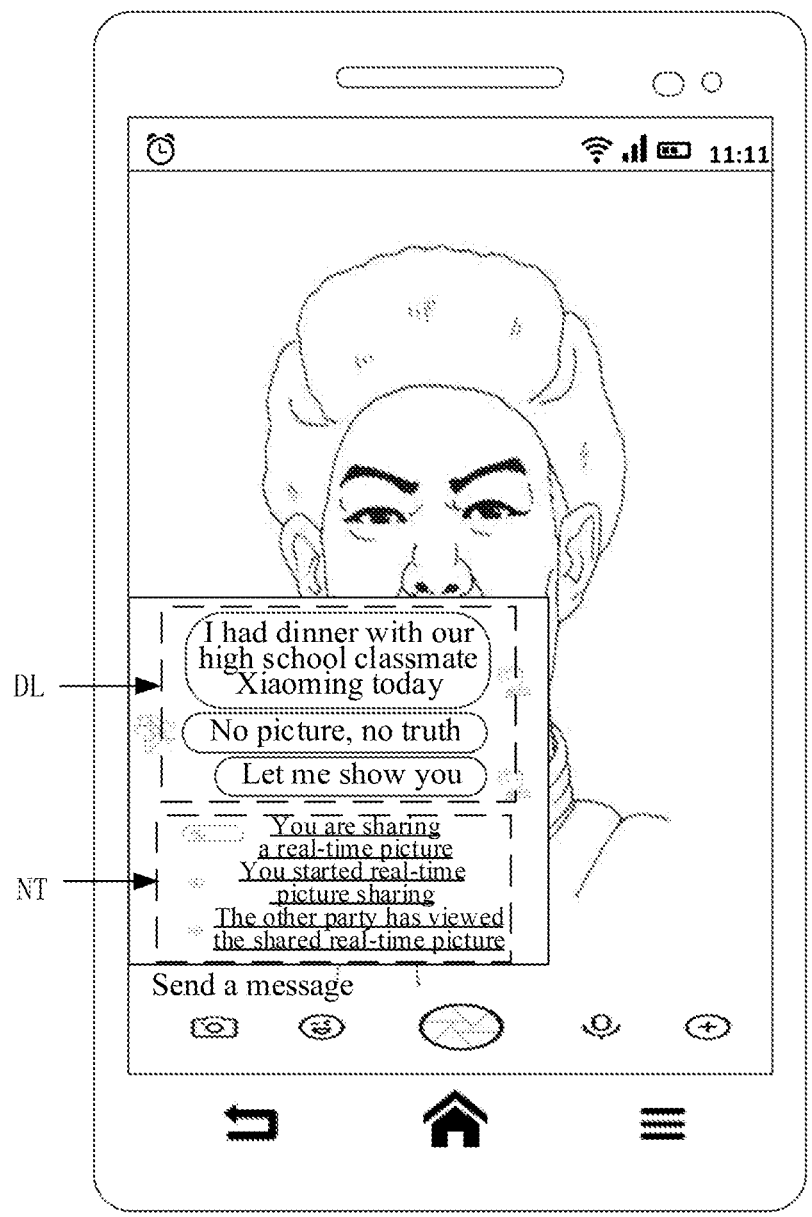
FIG. 4 is a second illustrative diagram of displaying a chat page on a first terminal according to an embodiment of the present disclosure.

It should be noted that, the preset area may be an entire area of the chat page as shown in FIG. 2 or FIG. 3, and may also be a partial area of the chat page as shown in FIG. 4. An image within the partial area may be blocked by the remaining information, an image outside the partial area will not be blocked by the remaining information, and the remaining information of the latest time is displayed within the partial area. As shown in FIG. 4, the partial area is located at the lower left corner of the image, DL is the dialogue information, and NT is the notification information.

In another embodiment of the present disclosure, attribute information of the preset area can be adjusted. In response to an area adjustment instruction, the attribute information of the preset area is adjusted, where the attribute information of the preset area includes, but is not limited to, size, transparency, color and position. In this way, the first user can flexibly adjust an attribute of the preset area, so as to avoid the image being blocked as far as possible.

Corresponding to the chat page on the first terminal as shown in FIG. 4, an image, dialogue information and notification information may also be displayed on the chat page of the second terminal in this way, and the second user may also adjust attribute information of the preset area, which will not be repeated here in the present disclosure.

In the embodiment of the present disclosure, the dialogue information can be superimposed and displayed in the preset area on the image, thereby avoiding large-area blocking of the image by the dialogue information, and improving display integrity of the image.

Optionally, according to one or more embodiments of the present disclosure, S101 includes S1011.

S1011: detect an operation instruction of the first user on a first video control, where the first video control is located in at least one of the following objects: the chat page of the first user with the second user, and an information entry corresponding to the second user in a user list.

The first video control is a control for sending video frames in real time, and after the first user operates the first video control, the first terminal turns on a camera to collect images.

The foregoing user list may include, but is not limited to, a user call list and a contact list, where the second user in the user call list is a user recently contacted by the first user, and the second user in the contact list is a user recorded on the first terminal.

In the user list, the information entry is used for displaying information about the second user, where the information entry includes, but is not limited to, identification information such as a name and an image of the second user. A user may also click on the information entry to enter a detail page. When the user list is the user call list, the detail page is a chat page, which may specifically include, but is not limited to, dialogue information such as a voice, a text and a video, and a corresponding dialogue time. When the user list is the contact list, the detail page may include, but is not limited to, detailed information such as contact information, a user address, a birthday, etc.

In the embodiment of the present disclosure, the first video control may be displayed on the chat page, and may also be displayed in the user list, thus, diversified display manners of a video control are provided. In addition, in the present disclosure, an objective of displaying an image on a chat page can be realized through operating the first video control only by the first user, and the second user does not need to perform any operation, thereby reducing operation complexity of the second user.

Optionally, according to one or more embodiments of the present disclosure, before S1011, S1012 to S1013 are further included.

S1012: detect a user state of the second user.

The second user is a user using the second terminal, and the second terminal receives and displays a video sent by the first terminal for the second user to view.

The user state includes, but is not limited to, an online state, an offline state, a busy state, and a do-not-disturb state. It can be understood that, when the user state is the online state, the second user can receive information such as a video and a text sent by the first terminal in real time through the second terminal. When the user state is the offline state or the busy state, the second user may not receive the information such as the video and the text sent by the first terminal in real time.

In practical applications, user behavior determines the user state. For example, login behavior of the second user may represent that the user state of the second user is the online state, logout behavior of the second user may represent that the user state of the second user is the offline state, and chatting behavior of the second user may represent that the user state of the second user is the online state.

Based on the foregoing user behavior, the first terminal may receive the user state of the second user sent by the second terminal. Specifically, the second terminal may send state notification information to the first terminal after the second user logs in, where the state notification information includes a user identifier of the second user and the user state being the online state. The second terminal may further send state notification information to the first terminal after the second user switches the user state, where the state notification information includes the user identifier of the second user and a user state obtained after switching. The second terminal may further send state notification information to the first terminal after the second user logs out, where the state notification information includes the user identifier of the second user and the user state being the offline state.

In another example of the present disclosure, the first terminal may obtain the user state of the second user by conducting analysis according to the user behavior of the second user. For example, if it is detected that the second user has chatting behavior at the current time or within a preset period of time before the current time, that is, the first terminal receives chat information sent by the second terminal, it may be determined that the user state of the second user is online. If it is detected that the second user does not receive chat information sent by the second terminal within a preset period of time before the current time, it may be determined that the user state of the second user is the offline state.

S1013: when the user state of the second user is the online state, display the first video control in the information entry corresponding to the second user.

Figure 5:
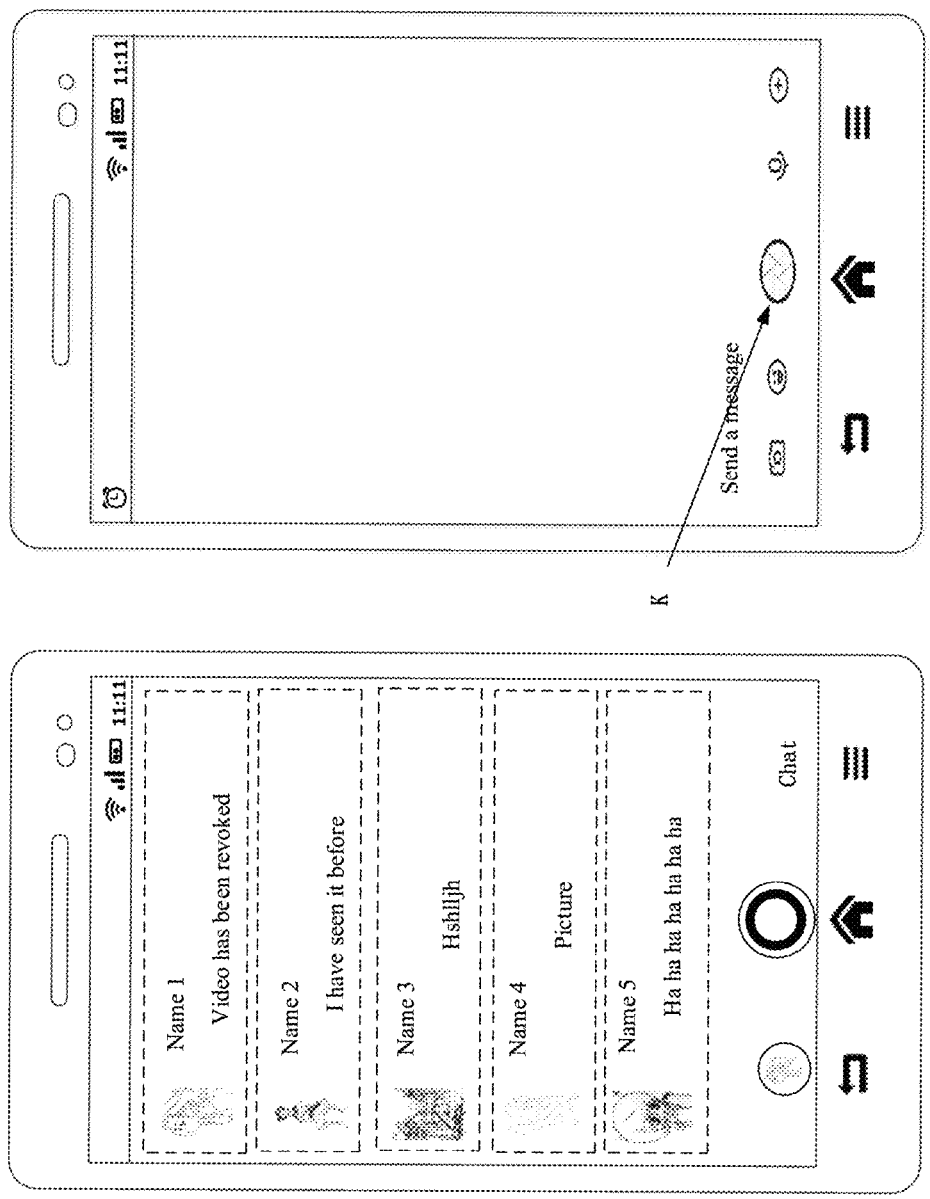
FIG. 5 is an illustrative diagram of a user list in the prior art.

FIG. 5 is an illustrative diagram of a user list in the prior art. In the prior art, when the first user needs to send a video, one of second users may be selected from a user list shown on the left side of FIG. 5 to enter a chat page with this second user as shown on the right side of FIG. 5, where a video control K is fixedly displayed. The first user can perform an operation on K to initiate a video request, so as to send a video to the second user in real time. However, in practical applications, when the first user operates the video control K, the first user does not know whether the second user is online, thus, the initiated video may not be viewed in real time, resulting in poor real-time performance of the video.

However, in the embodiment of the present disclosure, when the second user is in the online state, the first video control can be displayed in the information entry. It can be understood that, when the second user is in the online state, the second user may immediately view a video frame sent in real time, thus, a requirement of the application scenario for real-time-performance of viewing the video is relatively high.

Optionally, according to one or more embodiments of the present disclosure, based on S1012 and S1013, the method further includes S1014.

S1014: when the user state of the second user is a non-online state, display a second video control in the information entry corresponding to the second user; and in response to an operation instruction on the second video control, send a video clip generated from images collected by the camera to the second terminal.

The second video control is a control for sending a video clip. After the first user operates the second video control, the first terminal turns on the camera to collect an image. But a difference lies in that one frame of image is not sent to the second terminal immediately after this image is collected, instead, this image is temporarily stored. All collected images are spliced into a video clip according to a time sequence after ending the image collection, and the video clip is sent to the second terminal.

It can be understood that the non-online state includes, but is not limited to, an offline state, a busy state, and a do-not-disturb state. In this state, the second user does not view the sent video clip immediately, and can view the video clip in idle time, thus, the requirement of the application scenario for the real-time performance of viewing the video clip is relatively low.

Figure 6:
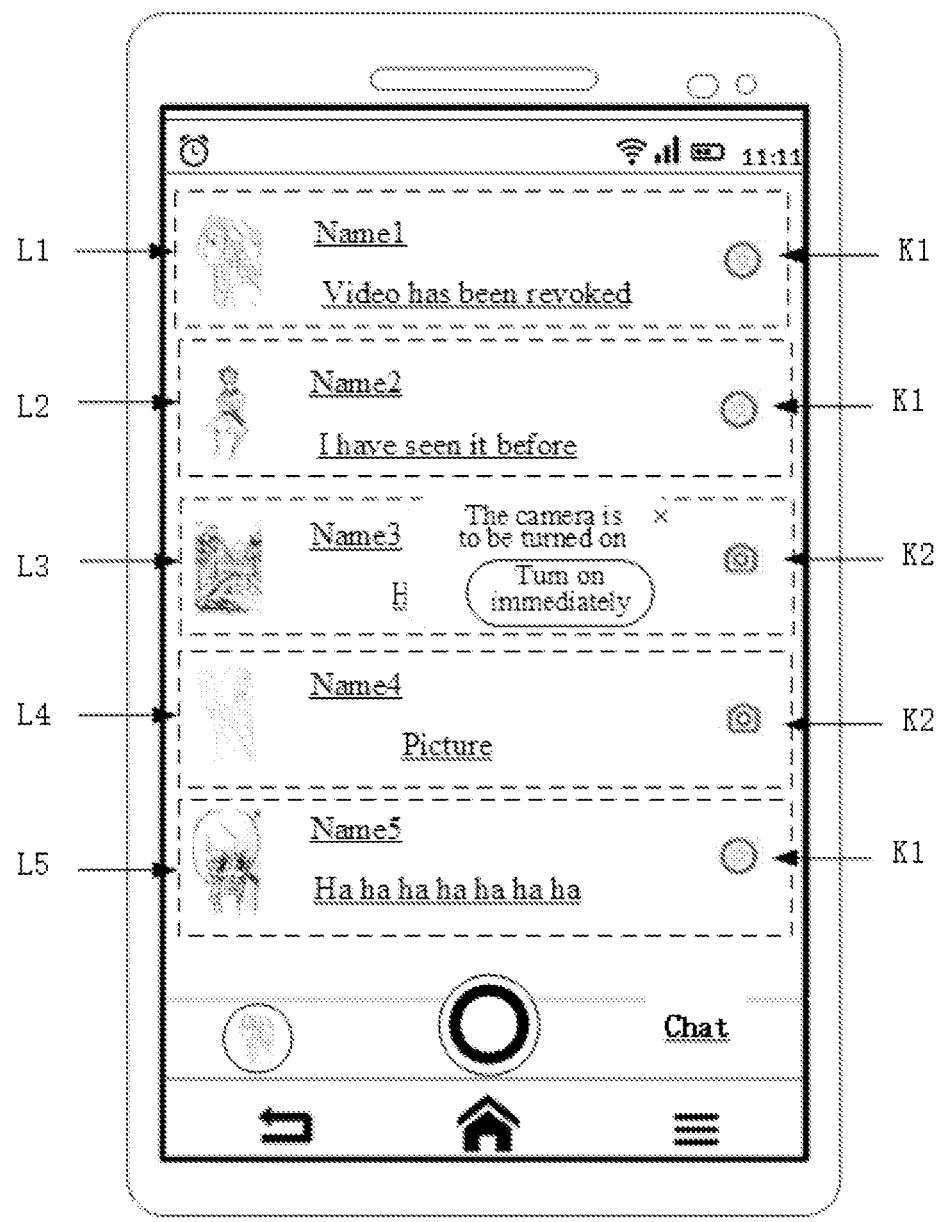
FIG. 6 is an illustrative diagram of displaying a user list on a first terminal according to an embodiment of the present disclosure.

In the present disclosure, the first video control or the second video control may be displayed in the information entry according to the user state. As shown in FIG. 6, a first video control K1 and a second video control K2 are displayed in the information entry. The user list is a user call list. In FIG. 6, five second users are included, and names are respectively: name 1 to name 5. Name 1 of a second user corresponds to an information entry L1, name 2 of a second user corresponds to an information entry L2, name 3 of a second user corresponds to an information entry L3, name 4 of a second user corresponds to an information entry L4, and name 5 of a second user corresponds to an information entry L5. The first video control or the second video control is displayed in the information entry of each second user, where the first video control K1 is displayed in each of the information entries L1, L2 and L5, and the second video control K2 is displayed in each of the information entries L3 and L4.

It should be noted that, after operating the first video control in the user list in FIG. 6, the first user may enter the chat page shown in FIG. 2, and the collected image can be displayed on the chat page in real time. In a case that the camera is turned on for the first time, after the first user performs an operation on K1 or K2 in the user list shown in FIG. 6, a prompt "The camera is to be turned on" may also be given to the first user, and the first user may select "Turn on immediately" to turn on the camera. In subsequent cases of turning on the camera, there will be no prompts.

In the embodiment of the present disclosure, a video control can be displayed in the user list according to the user state. On the one hand, the first user can directly realize a video operation with the second user in the user list, without needing to enter the chat page with the second user, thereby reducing operation complexity of the first user and improving efficiency of video communication. On the other hand, the first user can select one second user from a plurality of second users corresponding to the first video control to conduct a video communication, thereby improving flexibility of selecting a second user by the first user. Finally, the user can further select a second user corresponding to the second video control according to an actual requirement to share a video clip that has a relatively low requirement for real-time performance.

A typical application scenario of the present disclosure is that: the first terminal only sends a silent image to the second terminal, and does not send corresponding voice data to the second user at the same time; and the second terminal prompts the second user by means of intra-station notification or out-of-station notification, and does not inform the second user by means of ring tone or vibration. In addition, the camera turned on by the first terminal is generally not a front-facing camera, but is a camera for shooting in other directions, for example, a rear-facing camera. In this way, the first user can share a scene viewed by himself/herself to the second user in a silent manner, thereby enriching social experience.

Optionally, according to one or more embodiments of the present disclosure, sending the image collected by the camera of the first terminal to the second terminal in real time as the video frame in S102 includes S1021 to S1022.

S1021: send a video notification to the second terminal.

Figure 7:
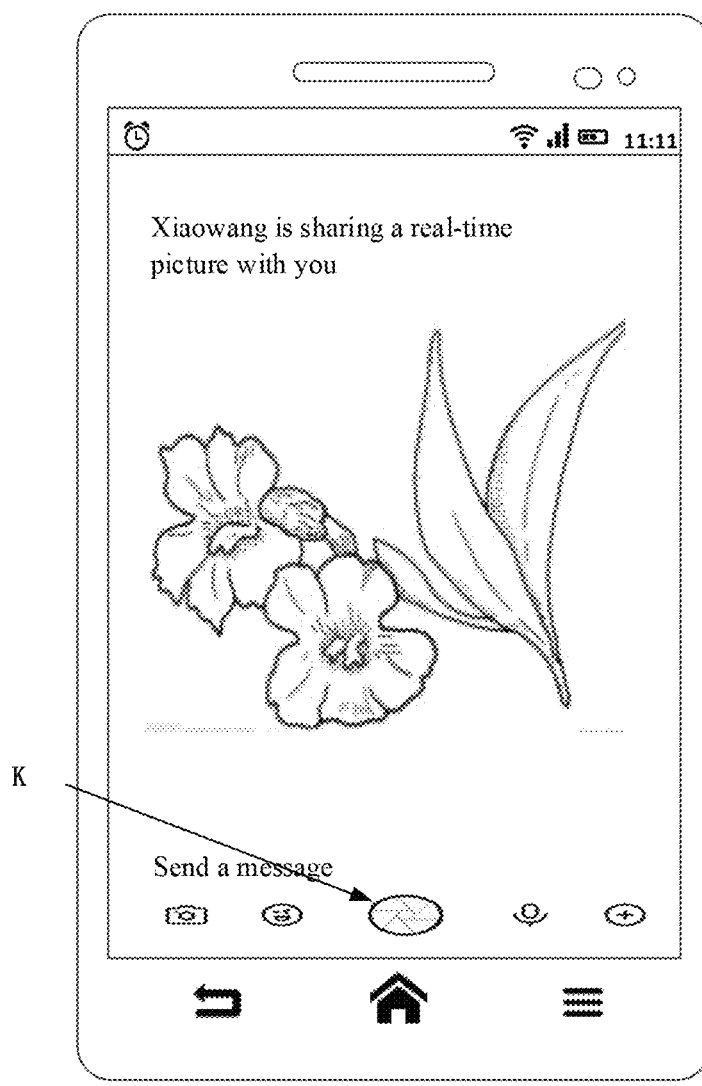
FIG. 7 is an illustrative diagram of displaying a video request on a second terminal according to an embodiment of the present disclosure.
Figure 8:
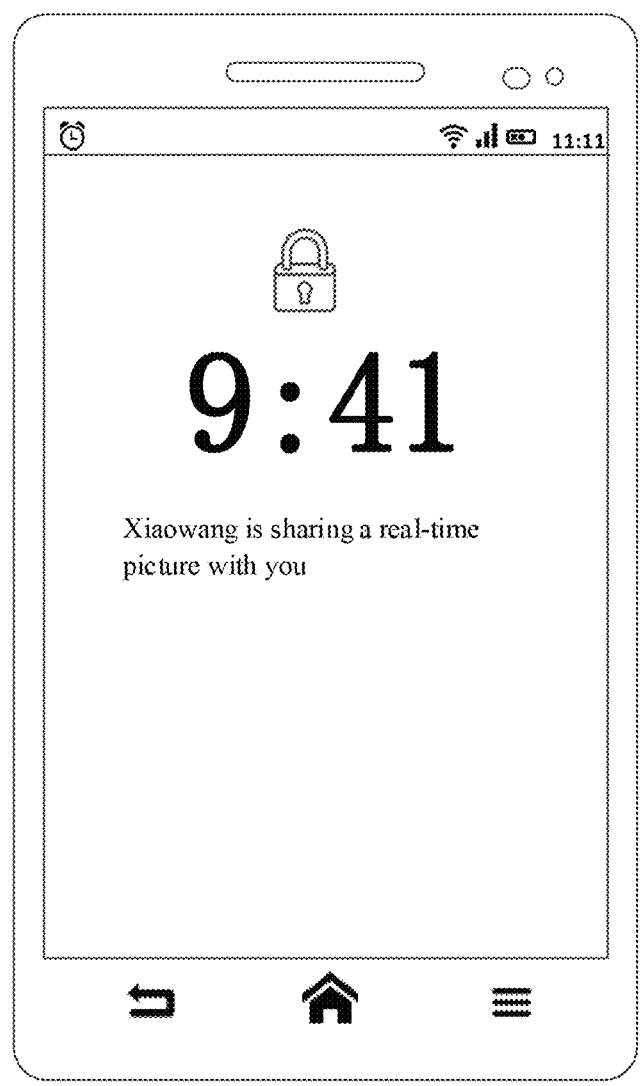
FIG. 8 is another illustrative diagram of displaying a video request on a second terminal according to an embodiment of the present disclosure.

The video notification may prompt the second user with intra-station information, and may also prompt the second user with system information. Specifically, when a social application is displayed in full screen on the second terminal, the first user of the social application initiates a video request to the second user, and the first terminal generates a video notification according to the video request. The second terminal displays the video notification in a manner of intra-station information. For example, as shown in FIG. 7, intra-station information "Xiaowang is sharing a real-time picture with you" is displayed within a preset area of the social application. When the second terminal is in a screen locking state, the first user of the social application initiates a video request to the second user, and the first terminal generates a video notification according to the video request. The second terminal displays the video notification in a manner of system information. As shown in FIG. 8, system information "Xiaowang is sharing a real-time picture with you" is displayed within a preset area of a screen locking interface.

S1022: in a case that the video notification is viewed, send the image collected by the camera of the first terminal to the second terminal in real time as the video frame.

Specifically, after the second terminal receives the video notification, the second user may click the video notification, and at this time, the second terminal will enter the chat page and begin to receive the video frame shot by the camera of the first terminal at the current time, so as to display the video frame on the chat page in real time. The second user clicking the video notification is to view the video notification.

In the embodiment of the present disclosure, when the user state of the second user is the online state, the second user can immediately receive the video frame sent in real time. In this case, the second user can receive the video request sent to the second terminal, and in combination with the operation of the second user, the real-time performance of viewing the video frame is ensured more accurately.

Optionally, according to one or more embodiments of the present disclosure, after S1021, S1023 to S1025 are further included.

S1023: in a case that the video notification is not viewed, end the video notification.

In actual applications, after the video notification is sent, if the second user does not accept the video notification within a preset time, the second terminal can end the video notification automatically, and there is no need for the user to end it manually. Definitely, within the preset time, the first user may also actively end the video notification on the first terminal.

The preset time may be set according to an actual application scenario, for example, may be set to 30 seconds.

S1024: send a recorded video clip to the second terminal, where the video clip is generated from images collected by the camera of the first terminal before ending the video notification.

In the present disclosure, after the first user operates the first video control on the first terminal, the first terminal may enter the chat page of the first user with the second user, and the image collected by the camera of the first terminal is displayed on the chat page in real time. After ending the video request, images collected between the start and end of the video request may be spliced into a video clip according to a time sequence.

S1025: revoke the video clip after the video clip is viewed.

In an example of the present disclosure, the first user may be allowed to set, on the first terminal, a threshold of the number of times of a video clip being viewed, and the number of times of the video clip being viewed is counted. When the number of times is greater than or equal to the threshold of the number of times, the video clip is revoked; and the video clip will not be revoked when the number of times is less than the threshold of the number of times.

However, the following exception may occur in the process of setting the threshold of the number of times. After the second user views the video clip, the first user sets the threshold of the number of times. In this scenario, the threshold of the number of times set by the first user has an inaccurate constraint on the number of times of viewing. In order to avoid this situation, in the present disclosure, the first user is allowed to set the threshold of the number of times within a preset time, and the threshold of the number of times cannot be set after the preset time. For example, the first user may be allowed to set the threshold of the number of times within 2 minutes after sending the video clip to the second terminal, and it is not allowed to set after 2 minutes.

Figure 9:
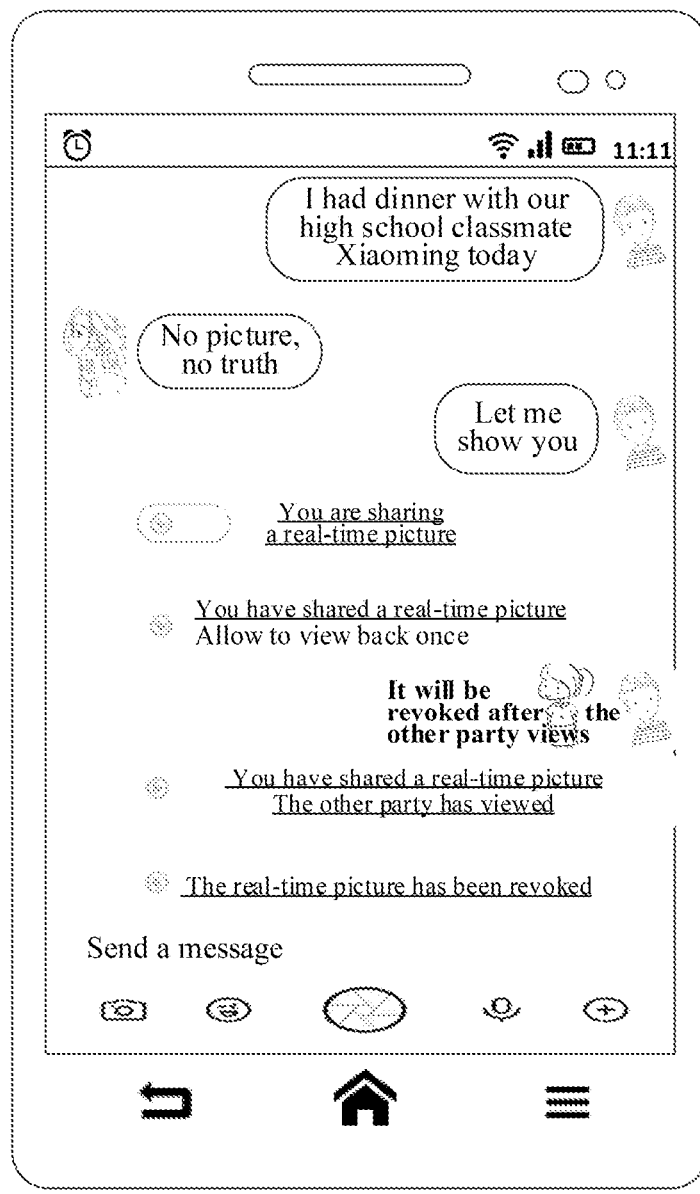
FIG. 9 is a third illustrative diagram of displaying a chat page on a first terminal according to an embodiment of the present disclosure.

Based on the above revoking method, a typical threshold of the number of times may be 1, that is, the video clip is revoked after being viewed once. For example, as shown in FIG. 9, on the chat page of the first terminal, the user may click notification information "Allow to view back once" to achieve that the video clip is only allowed to be viewed once. Thus, after the setting, prompt information "It will be revoked after the other party views" may be displayed on a thumbnail of the shared video clip.

Figure 10:
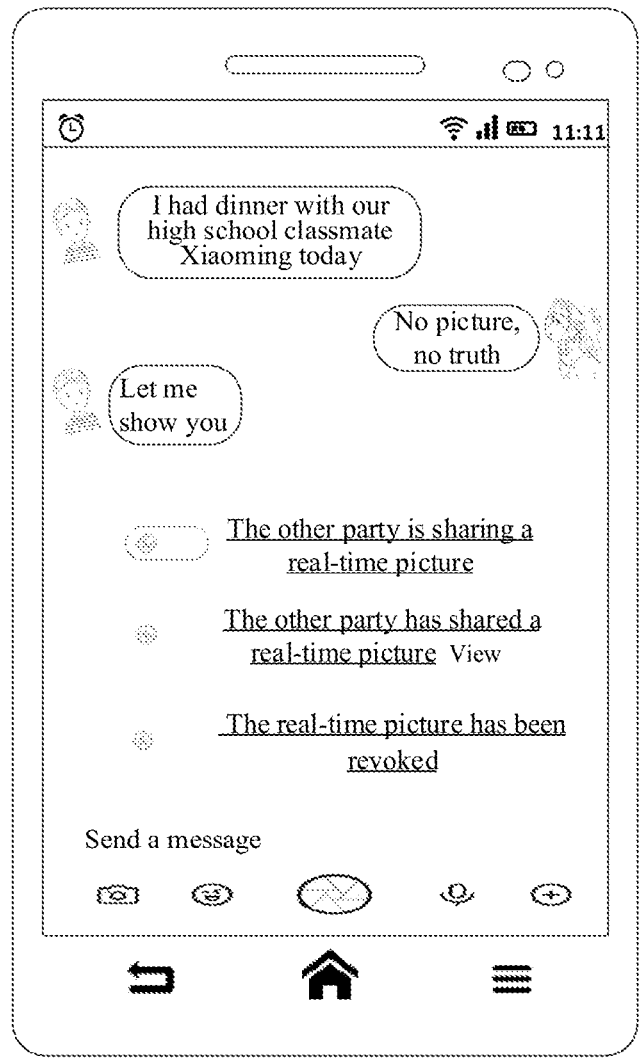
FIG. 10 is a second illustrative diagram of displaying a chat page on a second terminal according to an embodiment of the present disclosure.

It can be understood that, after the video clip is revoked, the first user may be prompted by notification information on the chat page of the first terminal. For example, as shown in FIG. 9, on the chat page, notification information "The other party has viewed" is displayed first, and then notification information "The real-time picture has been revoked" is displayed. Certainly, as shown in FIG. 10, the second user may also be prompted on the chat page of the second terminal by notification information "The real-time picture has been revoked". As shown in FIG. 10, on the chat page of the second terminal, the second user is prompted to view a shared video clip by notification information "The other party has shared a real-time picture", and the user can click "View" to play the video clip.

In the present disclosure, the video clip can be revoked after the second user views the video clip, thereby preventing the video clip from being downloaded, forwarded and the like, and effectively protecting privacy of the video clip.

Optionally, according to one or more embodiments of the present disclosure, the method further includes S103 to S104.

S103: receive an image collected by a camera of the second terminal.

In an embodiment of the present disclosure, the second user may also initiate video communication on the second terminal, so as to send the image collected by the camera of the second terminal to the first terminal, and specific operation steps are the same as the operation steps of the first user on the first terminal, which will not be repeated here.

S104: stop displaying the image collected by the camera of the first terminal on the chat page of the first user with the second user in real time, and display the image collected by the camera of the second terminal on the chat page of the first user with the second user in real time.

In the embodiment of the present disclosure, the image collected by the camera of the first terminal that initiates the video communication may be shared with the second terminal and displayed on the first terminal by default. In addition, after the second user shares a video, automatic switching can also be performed to display the image collected by the camera of the second terminal on both the first terminal and the second terminal. In this way, when the second user wants to initiate video communication to the first user, there is no need to exit the current video communication between the first user and the second user first and then initiate the video communication, thereby reducing operation complexity of the second user.

Optionally, according to one or more embodiments of the present disclosure, the method further includes S105 to S106.

S105: detect a switching instruction of the first user.

The switching instruction is an instruction on the first terminal for switching between the image collected by the camera of the first terminal and the image collected by the camera of the second terminal. For example, the first user may click a switching control on the first terminal.

S106: in response to the switching instruction, display an image obtained after switching on the chat page of the first user with the second user in real time, where the image obtained after switching includes one of: the image collected by the camera of the first terminal and the image collected by the camera of the second terminal.

It can be understood that, the second terminal may also perform a switching operation similar to that in S105 to S106, which is not limited in the present disclosure.

In the embodiment of the present disclosure, an image for display may be switched according to the switching instruction of the first user, which helps to improve flexibility of video display.

Optionally, according to one or more embodiments of the present disclosure, after sending the image collected by the camera of the first terminal to the second terminal as the video frame in real time in S102, S107 is further included.

S107: display different pieces of notification information which are differentially marked on the chat page of the first user with the second user, where the notification information is used for prompting a sending state of the video frame.

In the embodiment of the present disclosure, the notification information may be distinguished in a variety of ways which include, but are not limited to: an icon, color, size, etc. For example, as shown in FIG. 9 or FIG. 10, an icon for notification information for starting to share a real-time picture is different from an icon for notification information after sharing. Definitely, the icon for the notification information for starting to share a real-time picture can also be represented in a first color, and the icon for the notification information after sharing is represented in a second color, where the first color can be green, and the second color can be grey.

In the embodiment of the present disclosure, the notification information is differentially marked to distinguish different sending states. Marking the notification information differentially can facilitate the second user to acquire the sending state more quickly, thereby improving efficiency of the second user in acquiring the sending state.

In conclusion, according to the video processing method provided in the present embodiments, the image collected by the camera of the first terminal can be displayed on the chat page, and the remaining information such as chat content is superimposed and displayed on the image. Meanwhile, the image can also be sent to the second terminal, so that the second terminal displays in the same way. In this way, a new video display manner is provided for the first user and the second user in the video communication process, which helps to enrich diversity of video display.

Figure 11:
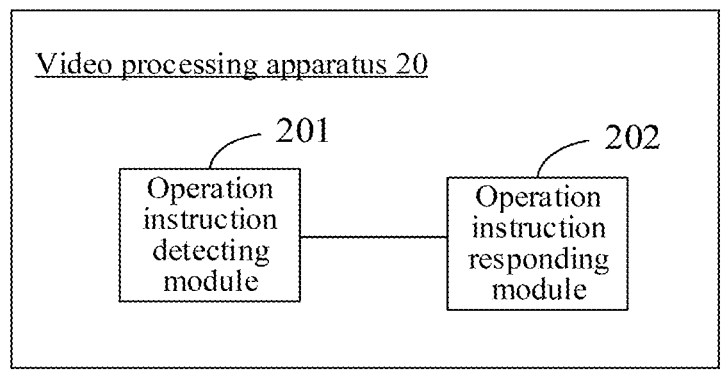
FIG. 11 is a structural block diagram of a video processing apparatus according to an embodiment of the present disclosure.

Corresponding to the video processing method in the foregoing embodiments, FIG. 11 is a structural block diagram of a video processing apparatus according to an embodiment of the present disclosure. For ease of description, only parts related to the embodiments of the present disclosure are shown. Referring to FIG. 11, the apparatus includes: an operation instruction detecting module 201 and an operation instruction responding module 202.

The operation instruction detection module 201 is configured to detect an operation instruction of a first user.

The operation instruction responding module 202 is configured to: in response to the operation instruction, display an image collected by a camera of the first terminal on a chat page of the first user with a second user in real time, superpose and display remaining information except the image within a preset area on the image, and send the image collected by the camera of the first terminal to the second terminal in real time as a video frame, so that the second terminal displays the image on a chat page of the second user with the first user in real time, and superposes and displays remaining information except the image within a preset area on the image; where the first terminal is a terminal corresponding to the first user, and the second terminal is a terminal corresponding to the second user.

Optionally, according to one or more embodiments of the present disclosure, the operation instruction detecting module 201 is further configured to:

detect an operation instruction of the first user on a first video control, where the first video control is located in at least one of the following objects: the chat page of the first user with the second user, and an information entry corresponding to the second user in a user list.

Optionally, according to one or more embodiments of the present disclosure, the apparatus further includes:

a user state detecting module, configured to detect a user state of the second user; and a first video control displaying module, configured to display the first video control in the information entry corresponding to the second user when the user state of the second user is an online state.

Optionally, according to one or more embodiments of the present disclosure, based on the user state detecting module and the first video control displaying module, the apparatus further includes:

a second video control displaying module, configured to: when the user state of the second user is a non-online state, display a second video control in the information entry corresponding to the second user; and in response to an operation instruction on the second video control, send a video clip generated from images collected by the camera to the second terminal.

Optionally, according to one or more embodiments of the present disclosure, the operation instruction responding module 202 is further configured to:

send a video notification to the second terminal; and in a case that the video notification is viewed, send the image collected by the camera of the first terminal to the second terminal in real time as the video frame.

Optionally, according to one or more embodiments of the present disclosure, the operation instruction responding module 202 is further configured to:

end the video notification in a case that the video notification is not viewed;

send a recorded video clip to the second terminal, where the video clip is generated from images collected by the camera of the first terminal before ending the video notification; and revoke the video clip after the video clip is viewed.

Optionally, according to one or more embodiments of the present disclosure, the apparatus further includes:

an image receiving module, configured to receive an image collected by a camera of the second terminal; and a display switching module, configured to stop displaying the image collected by the camera of the first terminal on the chat page of the first user with the second user in real time, and display the image collected by the camera of the second terminal on the chat page of the first user with the second user in real time.

Optionally, according to one or more embodiments of the present disclosure, the apparatus further includes:

a switching instruction detecting module, configured to detect a switching instruction of the first user; and a switching responding module, configured to: in response to the switching instruction, display an image obtained after switching on the chat page of the first user with the second user in real time, where the image obtained after switching includes one of: the image collected by the camera of the first terminal, and the image collected by the camera of the second terminal.

Optionally, according to one or more embodiments of the present disclosure, the operation instruction responding module 202 is further configured to:

display different pieces of notification information which are differentially marked on the chat page of the first user with the second user, where the notification information is used for prompting a sending state of the video frame.

The apparatus provided in the embodiments can be used to execute the technical solutions of the foregoing method embodiments, and implementation principles and technical effects thereof are similar, which are not repeatedly described here in the embodiments.

Figure 12:
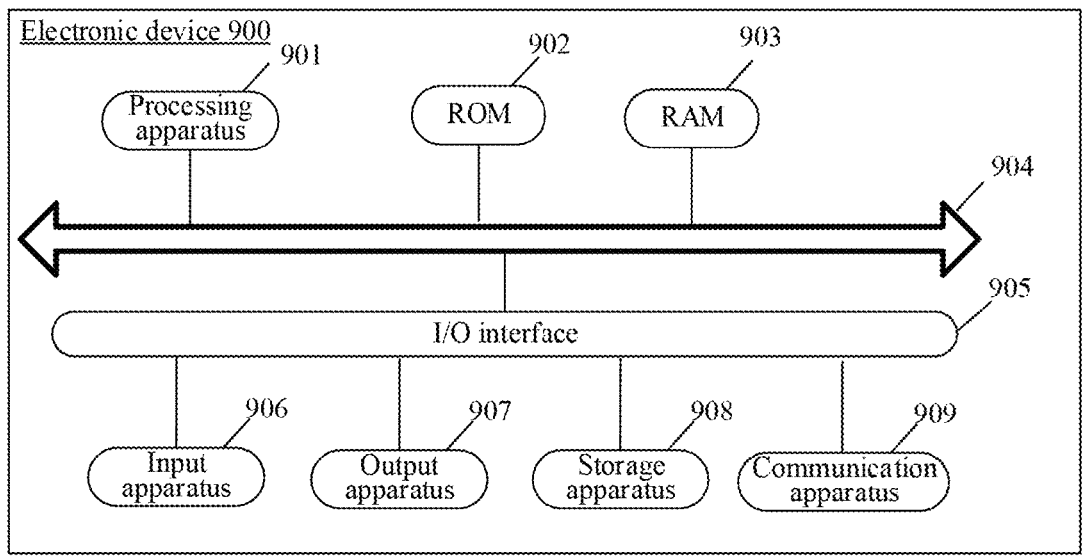
FIG. 12 is a schematic diagram of a hardware structure of an electronic device according to an embodiment of the present disclosure.

Referring to FIG. 12, FIG. 12 shows a schematic structural diagram of an electronic device 900 suitable for implementing an embodiment of the present disclosure, and the electronic device 900 may be a terminal device or a server. The terminal device may include, but is not limited to, a mobile terminal such as a mobile phone, a laptop computer, a digital broadcast receiver, a personal digital assistant (Personal Digital Assistant, PDA), a tablet computer (Portable Android Device, PAD), a portable multimedia player (Portable Media Player, PMP), a vehicle-mounted terminal (for example, a vehicle-mounted navigation terminal) and the like, and a fixed terminal such as a digital TV, a desktop computer and the like. The electronic device shown in FIG. 12 is merely an example and should not bring any limitation to the functions and scope of use of the embodiments of the present disclosure.

As shown in FIG. 12, the electronic device 900 may include a processing apparatus (e.g., a central processor unit, a graphics processor, etc.) 901 that may perform various suitable actions and processing in accordance with a program stored in a read only memory (Read Only Memory, ROM) 902 or a program loaded into a random access memory (Random Access Memory, RAM) 903 from a storage apparatus 908. In the RAM 903, various programs and data necessary for the operation of the electronic device 900 are also stored. The processing apparatus 901, the ROM 902 and the RAM 903 are connected to each other via a bus 904. An input/output (I/O) interface 905 is also connected to the bus 904.

In general, the following apparatuses may be connected to the I/O interface 905: an input apparatus 906 including, for example, a touch screen, a touch pad, a keyboard, a mouse, a camera, a microphone, an accelerometer, a gyroscope and the like; an output apparatus 907 including, for example, a liquid crystal display (Liquid Crystal Display, LCD), a speaker, a vibrator and the like; the storage apparatus 908 including, for example, a magnetic tape, a hard disk and the like; and a communication apparatus 909. The communication apparatus 909 may allow the electronic device 900 to perform wireless or wired communication with other devices to exchange data. Although FIG. 12 illustrates the electronic device 900 with a variety of apparatuses, it should be understood that, it is not necessary that all of the illustrated apparatuses should be implemented or provided. More or fewer apparatuses may alternatively be implemented or provided.

In particular, the processes described above with reference to the flowcharts can be implemented as computer software programs according to the embodiments of the present disclosure. For example, an embodiment of the present disclosure includes a computer program product including a computer program carried on a computer-readable medium. The computer program includes program codes for executing the method as shown in the flowcharts. In such an embodiment, the computer program may be downloaded and installed from a network via the communication apparatus 909, or installed from the storage apparatus 908, or installed from the ROM 902. When the computer program is executed by the processing apparatus 901, the above described functions defined in the method embodiments of the present disclosure are executed. An embodiment of the present disclosure also includes a computer program, and when the computer program is run on the electronic device, the described functions defined in the method embodiments of the present disclosure are executed.

It should be noted that, the computer-readable medium in the present disclosure may be a computer-readable signal medium or a computer-readable storage medium, or any combination thereof. The computer-readable storage medium may be, for example, but not limited to, an electronic, magnetic, optical, electromagnetic, infrared or semiconductor system, apparatus or device, or any suitable combination of the foregoing. More specific examples of the computer-readable storage medium may include, but are not limited to, an electrical connection based on one or more wires, a portable computer diskette, a hard disk, a random access memory (RAM), a read only memory (ROM), an erasable programmable read only memory (EPROM or Flash memory), an optical fiber, a portable compact disc read only memory (CD-ROM), an optical storage device, a magnetic storage device, or any suitable combination of the foregoing. In the present disclosure, the computer-readable storage medium may be any tangible medium that contains or stores a program for use by or in combination with an instruction execution system, apparatus or device. While in the present disclosure, the computer-readable signal medium may include data signals propagated in a baseband or as part of a carrier wave, in which computer-readable program codes are carried. Such propagated signals may take a variety of forms, including, but not limited to, an electromagnetic signal, an optical signal, or any suitable combination thereof. The computer-readable signal medium may also be any computer-readable medium that is not a computer-readable storage medium, and can send, propagate or transmit a program for use by or in combination with an instruction execution system, apparatus or device. Program codes contained on the computer-readable medium may be transmitted using any appropriate medium, including, but not limited to, a wireline, an optical fiber cable, RF (radio frequency), etc., or any suitable combination of the foregoing.

The computer-readable medium may be included in the electronic device, or may exist alone and not be installed in the electronic device.

The computer-readable medium carries one or more programs, and when the one or more programs are executed by the electronic device, the electronic device is caused to execute the method shown in the foregoing embodiments.

Computer program codes for carrying out operations of the present disclosure may be written in one or more programming languages or any combination thereof, including an object oriented programming language such as Java, Smalltalk, C++ and a conventional procedural programming language such as C programming language or similar programming languages. The program codes may be executed entirely on a user computer, executed partly on the user computer, executed as a stand-alone software package, executed partly on the user computer and partly on a remote computer, or executed entirely on the remote computer or server. In the scenario involving the remote computer, the remote computer may be connected to the user computer through any type of network, including a local area network (Local Area Network, LAN) or a wide area network (Wide Area Network, WAN), or may be connected to an external computer (for example, through the Internet of an Internet service provider).

The flowcharts and block diagrams in the accompanying drawings illustrate architectures, functionalities and operations of possible implementations of systems, methods and computer program products according to various embodiments of the present disclosure. In this regard, each block in the flowcharts or block diagrams may represent a module, a program segment, or a portion of code, which includes one or more executable instructions for implementing specified logical function(s). It should also be noted that, in some alternative implementations, the functions noted in the blocks may be implemented in an order different from those noted in the drawings. For example, two blocks shown in succession may, in fact, be executed substantially concurrently, or the blocks may sometimes be executed in the reverse order, depending upon the involved functionality. It should also be noted that, each block of the block diagrams and/or flowcharts and combinations of blocks in the block diagrams and/or flowcharts can be implemented by special-purpose hardware-based systems that perform specified functions or operations, or combinations of special-purpose hardware and computer instructions.

The units involved in the embodiments of the present disclosure may be implemented through software or hardware. The name of a unit does not constitute a limitation to the unit itself in some cases, for example, the operation instruction detecting module may also be described as "a module configured to detect an operation instruction of a first user".

The above functions described herein may be performed, at least in part, by one or more hardware logic components. For example, unrestrictedly, exemplary types of hardware logic components that can be used include: a Field Programmable Gate Array (FPGA), an Application Specific Integrated Circuit (ASIC), an Application Specific Standard Product (ASSP), a System on chip (SOC), a Complex Programmable Logic Device (CPLD), etc.

In the context of the present disclosure, a machine-readable medium may be a tangible medium that may contain or store a program for use by or in combination with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination of the foregoing. More specific examples of the machine-readable storage medium include an electrical connection based on one or more wires, a portable computer diskette, a hard disk, a random access memory (RAM), a read only memory (ROM), an erasable programmable read only memory (EPROM or Flash memory), an optical fiber, a compact disc read only memory (CD-ROM), an optical storage device, a magnetic storage device, or any suitable combination of the foregoing.

In a first aspect, according to one or more embodiments of the present disclosure, a video processing method is provided, which is applied to a first terminal and includes:
  detecting an operation instruction of a first user;
  in response to the operation instruction, displaying an image collected by a camera of the first terminal on a chat page of the first user with a second user in real time, superposing and displaying remaining information except the image within a preset area on the image; and sending the image collected by the camera of the first terminal to a second terminal in real time as a video frame, so that the second terminal displays the image on a chat page of the second user with the first user in real time, and superposes and displays remaining information except the image within a preset area on the image; where the first terminal is a terminal corresponding to the first user, and the second terminal is a terminal corresponding to the second user.

According to one or more embodiments of the present disclosure, detecting the operation instruction of the first user includes:
  detecting an operation instruction of the first user on a first video control, where the first video control is located in at least one of the following objects: the chat page of the first user with the second user, and an information entry corresponding to the second user in a user list.

According to one or more embodiments of the present disclosure, before detecting the operation instruction of the first user on the first video control, the method further includes:
  detecting a user state of the second user; and when the user state of the second user is an online state, displaying the first video control in the information entry corresponding to the second user.

According to one or more embodiments of the present disclosure, the method further includes:
  when the user state of the second user is a non-online state, displaying a second video control in the information entry corresponding to the second user; and in response to an operation instruction on the second video control, sending a video clip generated from images collected by the camera to the second terminal.

According to one or more embodiments of the present disclosure, sending the image collected by the camera of the first terminal to the second terminal in real time as the video frame includes:
  sending a video notification to the second terminal; and
  in a case that the video notification is viewed, sending the image collected by the camera of the first terminal to the second terminal in real time as the video frame.

According to one or more embodiments of the present disclosure, after sending the video notification to the second terminal, the method further includes:
  ending the video notification in a case that the video notification is not viewed;
  sending a recorded video clip to the second terminal, where the video clip is generated from images collected by the camera of the first terminal before ending the video notification; and revoking the video clip after the video clip is viewed.

According to one or more embodiments of the present disclosure, the method further includes:
  receiving an image collected by a camera of the second terminal; and stopping displaying the image collected by the camera of the first terminal on the chat page of the first user with the second user in real time, and displaying the image collected by the camera of the second terminal on the chat page of the first user with the second user in real time.

According to one or more embodiments of the present disclosure, the method further includes:
detecting a switching instruction of the first user; and
in response to the switching instruction, displaying an image obtained after switching on the chat page of the first user with the second user in real time, where the image obtained after switching includes one of: the image collected by the camera of the first terminal, and the image collected by the camera of the second terminal.

According to one or more embodiments of the present disclosure, after sending the image collected by the camera of the first terminal to the second terminal in real time as the video frame, the method further includes:
displaying different pieces of notification information which are differentially marked on the chat page of the first user with the second user, where the notification information is used for prompting a sending state of the video frame.

In a second aspect, according to one or more embodiments of the present disclosure, a video processing apparatus is provided, which is applied to a first terminal and includes:
an operation instruction detecting module, configured to detect an operation instruction of a first user; and
an operation instruction responding module, configured to: in response to the operation instruction, display an image collected by a camera of the first terminal on a chat page of the first user with a second user in real time, superpose and display remaining information except the image within a preset area on the image, and send the image collected by the camera of the first terminal to the second terminal in real time as a video frame, so that the second terminal displays the image on the chat page of the second user with the first user in real time, and superposes and displays remaining information except the image within a preset area on the image; where the first terminal is a terminal corresponding to the first user, and the second terminal is a terminal corresponding to the second user.

According to one or more embodiments of the present disclosure, the operation instruction detecting module is further configured to:
detect an operation instruction of the first user on a first video control, where the first video control is located in at least one of the following objects: the chat page of the first user with the second user, and an information entry corresponding to the second user in a user list.

According to one or more embodiments of the present disclosure, the apparatus further includes:
a user state detecting module, configured to detect a user state of the second user; and a first video control displaying module, configured to display the first video control in the information entry corresponding to the second user when the user state of the second user is an online state.

According to one or more embodiments of the present disclosure, based on the user state detecting module and the first video control displaying module, the apparatus further includes:
a second video control displaying module, configured to: when the user state of the second user is a non-online state, display a second video control in the information entry corresponding to the second user; and in response to an operation instruction on the second video control, send a video clip generated from images collected by the camera to the second terminal.

According to one or more embodiments of the present disclosure, the operation instruction responding module is further configured to:
send a video notification to the second terminal; and
in a case that the video notification is viewed, send the image collected by the camera of the first terminal to the second terminal in real time as the video frame.

According to one or more embodiments of the present disclosure, the operation instruction responding module is further configured to:
end the video notification in a case that the video notification is not viewed;
send a recorded video clip to the second terminal, where the video clip is generated from images collected by the camera of the first terminal before ending the video notification; and revoke the video clip after the video clip is viewed.

According to one or more embodiments of the present disclosure, the apparatus further includes:
an image receiving module, configured to receive an image collected by a camera of the second terminal; and
a display switching module, configured to stop displaying the image collected by the camera of the first terminal on the chat page of the first user with the second user in real time, and display the image collected by the camera of the second terminal on the chat page of the first user with the second user in real time.

According to one or more embodiments of the present disclosure, the apparatus further includes:
a switching instruction detecting module, configured to detect a switching instruction of the first user; and
a switching responding module, configured to: in response to the switching instruction, display an image obtained after switching on the chat page of the first user with the second user in real time, where the image obtained after switching includes one of: the image collected by the camera of the first terminal, and the image collected by the camera of the second terminal.

According to one or more embodiments of the present disclosure, the operation instruction responding module is further configured to:
display different pieces of notification information which are differentially marked on the chat page of the first user with the second user, where the notification information is used for prompting a sending state of the video frame.

In a third aspect, according to one or more embodiments of the present disclosure, an electronic device is provided, including: at least one processor and a memory;
the memory stores computer execution instructions; and
the at least one processor executes the computer execution instructions stored in the memory, so that the at least one processor executes the video processing method in the first aspect or various possible designs of the first aspect.

In a fourth aspect, according to one or more embodiments of the present disclosure, a computer-readable storage medium is provided. The computer-readable storage medium stores computer execution instructions, and when the computer execution instructions are executed by a processor, the video processing method in the first aspect and various possible designs of the first aspect is implemented.

The foregoing description is merely illustrative of the preferred embodiments of the present disclosure and of the technical principles applied thereto. It should be appreciated by a person skilled in the art that, the disclosure scope of the present disclosure is not limited to the technical solutions formed by specific combinations of the described technical features, and meanwhile should also cover other technical solutions formed by any combination of the described technical features or equivalent features thereof without departing from the described disclosed concept, for example, technical solutions formed by substituting the above features and technical features having similar functions as disclosed in the present disclosure (but not limited thereto) for one another.

In addition, while operations are depicted in a particular order, it should not be understood as that the operations need to be performed in a particular order as shown or in a sequential order. Multitasking and parallel processing may be advantageous in certain circumstances. Likewise, while several specific implementation details are included in the above discussion, these should not be construed as limiting the scope of the present disclosure. Certain features that are described in the context of separate embodiments can also be implemented in combination in a single embodiment. Conversely, various features that are described in the context of a single embodiment can also be implemented separately or in any suitable sub-combination.

Although the subject matter has been described in language specific to structural features and/or method logical acts, it should be understood that, the subject matter defined in the appended claims is not necessarily limited to the specific features or acts described above. Rather, the specific features and acts described above are merely illustrative forms for implementing the claims.

What is claimed is:

1. A video processing method, applied to a first terminal, comprising:
   detecting an operation instruction of a first user; and
   in response to the operation instruction, displaying an image collected by a camera of the first terminal on a chat page of the first user with a second user in real time, superposing and displaying remaining information except the image within a preset area on the image; and sending the image collected by the camera of the first terminal to a second terminal in real time as a video frame, so that the second terminal displays the image on a chat page of the second user with the first user in real time, and superposes and displays remaining information except the image within a preset area on the image; wherein the first terminal is a terminal corresponding to the first user, and the second terminal is a terminal corresponding to the second user, wherein
   detecting the operation instruction of the first user comprises detecting an operation instruction of the first user on a first video control, the first video control being located in at least one of the following objects: the chat page of the first user with the second user, and an information entry corresponding to the second user in a user list, and
   before detecting the operation instruction of the first user on the first video control, the method further comprises:
   detecting a user state of the second user; and
   when the user state of the second user is an online state, displaying the first video control in the information entry corresponding to the second user.

2. The method according to claim 1, wherein the method further comprises:
   when the user state of the second user is a non-online state, displaying a second video control in the information entry corresponding to the second user; and in response to an operation instruction on the second video control, sending a video clip generated from images collected by the camera to the second terminal.

3. The method according to claim 1, wherein sending the image collected by the camera of the first terminal to the second terminal in real time as the video frame comprises:
   sending a video notification to the second terminal; and
   in a case that the video notification is viewed, sending the image collected by the camera of the first terminal to the second terminal in real time as the video frame.

4. The method according to claim 3, after sending the video notification to the second terminal, further comprising:
   ending the video notification in a case that the video notification is not viewed;
   sending a recorded video clip to the second terminal, wherein the video clip is generated from images collected by the camera of the first terminal before ending the video notification; and
   revoking the video clip after the video clip is viewed.

5. The method according to claim 1, wherein the method further comprises:
   receiving an image collected by a camera of the second terminal; and
   stopping displaying the image collected by the camera of the first terminal on the chat page of the first user with the second user in real time, and displaying the image collected by the camera of the second terminal on the chat page of the first user with the second user in real time.

6. The method according to claim 5, wherein the method further comprises:
   detecting a switching instruction of the first user; and
   in response to the switching instruction, displaying an image obtained after switching on the chat page of the first user with the second user in real time, wherein the image obtained after switching comprises one of: the image collected by the camera of the first terminal, and the image collected by the camera of the second terminal.

7. The method according to claim 1, after sending the image collected by the camera of the first terminal to the second terminal in real time as the video frame, further comprising:
   displaying different pieces of notification information which are differentially marked on the chat page of the first user with the second user, wherein the notification information is used for prompting a sending state of the video frame.

8. An electronic device, comprising: at least one processor and a memory;
   the memory stores a computer program; and
   the at least one processor executes the computer program stored in the memory to:
   detect an operation instruction of a first user;
   in response to the operation instruction, display an image collected by a camera of a first terminal on a chat page of the first user with a second user in real time, superpose and display remaining information except the image within a preset area on the image; and send the image collected by the camera of the first terminal to a second terminal in real time as a video frame, so that the second terminal displays the image on a chat page of the second user with the first user in real time, and superposes and displays remaining information except the image within a preset area on the image;

wherein the first terminal is a terminal corresponding to the first user, and the second terminal is a terminal corresponding to the second user, wherein the at least one processor executes the computer program stored in the memory to:
   detect a user state of the second user;
   when the user state of the second user is an online state, display a first video control in an information entry corresponding to the second user in a user list; and
   detect an operation instruction of the first user on the first video control.

9. The electronic device according to claim 8, wherein the at least one processor further executes the computer program stored in the memory to:
   when the user state of the second user is a non-online state, display a second video control in the information entry corresponding to the second user; and in response to an operation instruction on the second video control, send a video clip generated from images collected by the camera to the second terminal.

10. The electronic device according to claim 8, wherein the at least one processor executes the computer program stored in the memory to:
   send a video notification to the second terminal; and
   in a case that the video notification is viewed, send the image collected by the camera of the first terminal to the second terminal in real time as the video frame.

11. The electronic device according to claim 10, wherein the at least one processor further executes the computer program stored in the memory to:
   end the video notification in a case that the video notification is not viewed;
   send a recorded video clip to the second terminal, wherein the video clip is generated from images collected by the camera of the first terminal before ending the video notification; and
   revoke the video clip after the video clip is viewed.

12. The electronic device according to claim 8, wherein the at least one processor further executes the computer program stored in the memory to:
   receive an image collected by a camera of the second terminal; and
   stop displaying the image collected by the camera of the first terminal on the chat page of the first user with the second user in real time, and display the image collected by the camera of the second terminal on the chat page of the first user with the second user in real time.

13. The electronic device according to claim 12, wherein the at least one processor further executes the computer program stored in the memory to:
   detect a switching instruction of the first user; and
   in response to the switching instruction, display an image obtained after switching on the chat page of the first user with the second user in real time, wherein the image obtained after switching comprises one of: the image collected by the camera of the first terminal, and the image collected by the camera of the second terminal.

14. The electronic device according to claim 8, wherein the at least one processor further executes the computer program stored in the memory to:
   display different pieces of notification information which are differentially marked on the chat page of the first user with the second user, wherein the notification information is used for prompting a sending state of the video frame.

15. A non-transitory computer-readable storage medium, wherein the computer-readable storage medium stores computer execution instructions, and when the computer execution instructions are executed by a processor, the following operations are executed:
   detecting an operation instruction of a first user;
   in response to the operation instruction, displaying an image collected by a camera of a first terminal on a chat page of the first user with a second user in real time, superposing and displaying remaining information except the image within a preset area on the image;
   and sending the image collected by the camera of the first terminal to a second terminal in real time as a video frame, so that the second terminal displays the image on a chat page of the second user with the first user in real time, and superposes and displays remaining information except the image within a preset area on the image; wherein the first terminal is a terminal corresponding to the first user, and the second terminal is a terminal corresponding to the second user, wherein the operation of detecting the operation instruction of the first user comprises detecting an operation instruction of the first user on a first video control, the first video control being located in at least one of the following objects: the chat page of the first user with the second user, and an information entry corresponding to the second user in a user list, and before detecting the operation instruction of the first user on the first video control, the operations further comprise:
   detecting a user state of the second user; and
   when the user state of the second user is an online state, displaying the first video control in the information entry corresponding to the second user.

\* \* \* \* \*